I. S. BUNNELL.
Domestic Boiler.
No. 102,765.
Patented May 10, 1870.
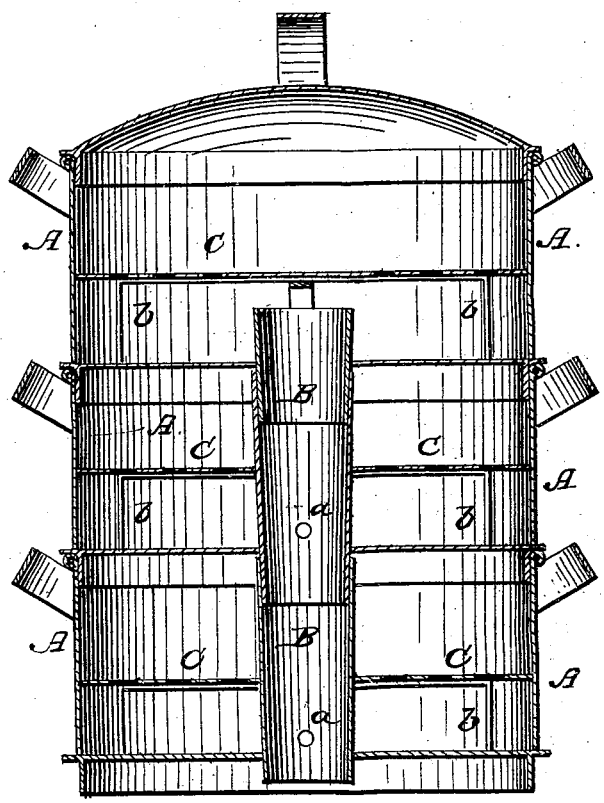

United States Patent Office.

ISAAC S. BUNNELL, OF CARBONDALE, PENNSYLVANIA.

Letters Patent No. 102,765, dated May 10, 1870.

CULINARY BOILER.

The Schedule referred to in these Letters Patent and making part of the same.

*To all whom it may concern:*

Be it known that I, ISAAC S. BUNNELL, of Carbondale, in the county of Luzerne and State of Pennsylvania, have invented a new and Improved Culinary Boiler; and I do hereby declare that the following is a full, clear, and exact description thereof, which will enable others skilled in the art to make and use the same, reference being had to the accompanying drawing forming part of this specification, in which—

The drawing represents a sectional side view of my improved culinary boiler.

The object of this invention is to construct a culinary boiler, in which one, two, or more separate dishes may be cooked at the same time, without mixing the flavor of the several articles.

The invention consists in arranging, within each one of a series of vessels, which are set one upon the other, a perforated false bottom, and in connecting the pipe, which conducts the steam to the said vessel, with the lower part under the false bottom of each, all as hereinafter more fully described.

A A, in the drawing, are a series of metal vessels, set one upon the other, to form several receptacles of materials to be boiled. The bottom of each upper vessel constitutes the cover of the one below. The lowermost vessel A is set upon a hot-water boiler, from which steam is to be conducted to the several vessels for boiling the contents of the same.

The steam is carried up from the said boiler in a pipe, B, which projects through the several vessels A, as shown.

The steam-pipe has apertures, a, near the bottom of each vessel, to discharge steam into the lower part of the same.

The steam-pipe may be composed of sections, which are respectively parts of the several vessels, as shown, or it is made of one piece. In the latter case the pipe is rigidly connected with the partitions of the lowermost of the series of vessels A, and extends upward through the apertures in the partitions of the other vessels.

In each vessel, A, is arranged and supported on suitable standards or lugs, b b, a perforated false bottom, C.

The articles to be cooked are placed upon the false bottoms, whereby the steam is enabled to penetrate them, the condensed steam dropping off on the real bottoms. Thus steam is conducted separately to the several vessels, and their contents are boiled without intermixing the flavor.

Having thus described my invention,

I claim as new and desire to secure by Letters Patent—

The vessels A A, set one upon the other, provided with the perforated false bottoms C, and connected with the steam-pipe B, substantially as herein shown and described.

I. S. BUNNELL.

Witnesses:
JOHN STUART,
J. G. THOMPSON.